(12) United States Patent  
Kim

(10) Patent No.: US 12,473,610 B2  
(45) Date of Patent: Nov. 18, 2025

(54) STEEL SHEET FOR ENAMEL AND METHOD OF MANUFACTURING THE SAME

(71) Applicant: POSCO Co., Ltd, Pohang-si (KR)

(72) Inventor: Jai-Ik Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 432 days.

(21) Appl. No.: 18/035,157

(22) PCT Filed: Nov. 4, 2021

(86) PCT No.: PCT/KR2021/015944  
§ 371 (c)(1),  
(2) Date: May 3, 2023

(87) PCT Pub. No.: WO2022/098132  
PCT Pub. Date: May 12, 2022

(65) Prior Publication Data  
US 2024/0011115 A1  Jan. 11, 2024

(30) Foreign Application Priority Data  
Nov. 5, 2020  (KR) .................. 10-2020-0147141

(51) Int. Cl.  
*B32B 15/04*  (2006.01)  
*B32B 17/06*  (2006.01)  
(Continued)

(52) U.S. Cl.  
CPC .......... *C21D 9/46* (2013.01); *C21D 1/74* (2013.01); *C21D 6/005* (2013.01); *C21D 6/008* (2013.01);  
(Continued)

(58) Field of Classification Search  
CPC ..................................... C22C 38/00  
(Continued)

(56) References Cited

U.S. PATENT DOCUMENTS

| | | | |
|---|---|---|---|
| 6,361,624 B1 * | 3/2002 | Altemus | C21D 8/0473 420/128 |
| 7,922,837 B2 * | 4/2011 | Murakami | C22C 38/16 148/648 |

(Continued)

FOREIGN PATENT DOCUMENTS

| | | |
|---|---|---|
| CN | 101517115 A | 8/2009 |
| CN | 104775069 A | 7/2015 |

(Continued)

OTHER PUBLICATIONS

Search Report dated March 6. 2025 issued in corresponding Chinese Patent Application No. 202180075041.5.

(Continued)

*Primary Examiner* — Lauren R Colgan  
(74) *Attorney, Agent, or Firm* — Morgan Lewis & Bockius LLP

(57) ABSTRACT

An exemplary embodiment of the present invention provides an enamel steel sheet, including: by wt % (% by weight), 0.01 to 0.05% of C, 0.05 to 0.8% of Mn, 0.001 to 0.03% of Si, 0.03 to 0.12% of Al, 0.001 to 0.02% of P, 0.001 to 0.02% of S, 0.004% or less (excluding 0%) of N, 0.001 to 0.003% of B, 0.003% or less (excluding 0%) of O, and the balance of Fe and inevitable impurities. The enamel steel sheet according to an exemplary embodiment of the present invention includes an oxide layer in an inside direction from a surface, and a thickness of the oxide layer is 0.006 to 0.030 µm.

15 Claims, 2 Drawing Sheets

(51) Int. Cl.
    *C21D 1/74*     (2006.01)
    *C21D 6/00*     (2006.01)
    *C21D 8/02*     (2006.01)
    *C21D 9/46*     (2006.01)
    *C22C 38/00*     (2006.01)
    *C22C 38/02*     (2006.01)
    *C22C 38/04*     (2006.01)
    *C22C 38/06*     (2006.01)

(52) U.S. Cl.
    CPC ......... *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C21D 2211/003* (2013.01)

(58) Field of Classification Search
    USPC .................................................. 428/701, 702
    See application file for complete search history.

(56) References Cited

U.S. PATENT DOCUMENTS

| | | | | |
|---|---|---|---|---|
| 9,073,114 | B2* | 7/2015 | Murakami | ........... C21D 8/0226 |
| 2003/0129444 | A1* | 7/2003 | Matsuoka | ............. C23C 2/0222 |
| | | | | 428/659 |
| 2004/0244885 | A1* | 12/2004 | Murakami | .............. C22C 38/12 |
| | | | | 148/648 |
| 2005/0236078 | A1* | 10/2005 | Murakami | ............ C22C 38/002 |
| | | | | 148/320 |
| 2009/0047168 | A1* | 2/2009 | Murakami | .............. C22C 38/32 |
| | | | | 420/104 |
| 2010/0040872 | A1* | 2/2010 | Murakami | .............. C22C 38/04 |
| | | | | 148/648 |
| 2010/0086431 | A1* | 4/2010 | Murakami | ........... C21D 8/0273 |
| | | | | 420/91 |
| 2021/0130938 | A1* | 5/2021 | Gill | ........................ C22C 38/002 |
| 2023/0029838 | A1* | 2/2023 | Kim | ........................ C22C 38/00 |

FOREIGN PATENT DOCUMENTS

| | | |
|---|---|---|
| CN | 106560523 A | 4/2017 |
| EP | 3196328 A1 | 7/2017 |
| JP | H06-279864 A | 10/1994 |
| JP | H06-322445 A | 11/1994 |
| JP | H107-41864 A | 2/1995 |
| JP | 2006045580 A | 2/2006 |
| KR | 10-2004-0027981 A | 4/2004 |
| KR | 10-0480201 B1 | 4/2005 |
| KR | 10-2009-0043570 A | 5/2009 |
| KR | 10-2014-0014248 A | 2/2014 |
| KR | 10-2014-0053322 A | 5/2014 |
| KR | 10-2021-0080723 A | 7/2021 |
| WO | 2019039715 A1 | 2/2019 |
| WO | 2019112152 A1 | 6/2019 |

OTHER PUBLICATIONS

International Search Report dated Feb. 15, 2022, issued in International Patent Application No. PCT/KR2021/015944 (with English translation).

D. J. Blickwede, "Decarburization by Open-Coil Annealing," Journal of Metals, Aug. 1961.

* cited by examiner

STEEL SHEET FOR ENAMEL AND METHOD OF MANUFACTURING THE SAME

CROSS-REFERENCE OF RELATED APPLICATIONS

This application is the U.S. National Phase under 35 U.S.C. § 371 of International Patent Application No. PCT/KR2021/015944, filed on Nov. 4, 2021, which in turn claims the benefit of Korean Application No. 10-2020-0147141, filed on Nov. 5, 2020, the disclosures of which applications are incorporated by reference herein.

TECHNICAL FIELD

An exemplary embodiment of the present invention relates to an enamel steel sheet and a method of manufacturing the same. More specifically, an exemplary embodiment of the present invention relates to a continuous annealing type enamel steel sheet for processing that does not cause bubble defects after enamel treatment and has excellent enamel adhesion and fishscale resistance, and a method of manufacturing the same.

BACKGROUND ART

An enamel steel sheet is a type of surface treatment product that improves corrosion resistance, weather resistance, heat resistance, and the like by applying a vitreous glaze on a base steel sheet such as a hot-rolled steel sheet or a cold-rolled steel sheet and then firing the base steel sheet at a high temperature. This enamel steel sheet is used as materials for exterior construction, home appliances, tableware, and various industries.

Rimmed steel has been used as an enamel steel sheet for a long time. However, as continuous casting has been actively used in terms of productivity improvement, most materials are being continuously cast. In addition, a fishscale defect, which is one of the most fatal defects of the enamel steel sheet in steel manufacturing, is a representative enamel defect that is caused by dropping out an enamel layer in the form of fishscales as hydrogen dissolved in steel during the manufacture of an enamel product exists supersaturated in the steel while the enamel steel sheet is fired and cooled, and is then released to a surface of the steel. When such a fishscale defect occurs, rust occurs intensively in a defective site, for example, which greatly reduces the value of the enamel product. Therefore, it is necessary to suppress the occurrence of the fishscale. In order to prevent the fishscale defect, it is necessary to form a large number of sites in the steel that may hold hydrogen dissolved in the steel. In order to prevent the fishscale defect that lowers enamel properties or to improve aging properties, an open coil annealing (OCA) method, which is a type of normal annealing method, has been often applied. In this case, however, there is a problem in that the productivity is lowered due to heat treatment for a long time, the manufacturing cost increases, and quality deviation increases. In addition, the open coil annealing method has a problem in that it is difficult to control an amount of decarburization, and when an amount of carbon in the steel is too small because the amount of decarburization is too large, grain boundaries of the steel sheet are softened, and thus, cracks such as brittle fractures occur during molding of a product. In order to overcome the problems of inferior productivity and increase in manufacturing cost caused due to such long-term annealing, the recently developed enamel steel sheet is actively using the continuous annealing process. In this case, as a hydrogen occlusion source, precipitates such as titanium, inclusions using non-deoxidized steel, or the like have been used. However, even in this case, there is a problem in that the occurrence rate of surface defects increases due to addition of a large amount of carbonitride-forming elements or non-deoxidized compounds, the recrystallization temperature rises to cause various quality problems such as reduction in pass-through ability, to lower productivity, and to increase costs.

In other words, in the enamel steel sheet using titanium (Ti)-based precipitates, as a large amount of titanium is added to suppress the hydrogen reaction that causes the fishscale, nozzle clogging by titanium nitride (TiN) and inclusions occurs frequently during the continuous casting of the steelmaking process, which is a direct factor in the deterioration in workability and the production load. In addition, as TiN mixed in molten steel is present on the top of the steel sheet, a blister defect, which is a representative bubble defect, is caused, and titanium added in a large amount becomes a factor that inhibits adhesion between a steel sheet and a glaze layer.

On the other hand, a high oxygen enamel steel sheet, which secures fishscale resistance by occluding hydrogen using inclusions such as oxides in the steel by increasing the dissolved oxygen content inside the steel sheet, also has a fundamental problem in that an oxygen content is fundamentally high to make a dissolution loss of refractories severe, which greatly reduces the continuous casting productivity in the steelmaking process and causes frequent surface defects.

DISCLOSURE

Technical Problem

In an exemplary embodiment of the present invention, it is intended to provide an enamel steel sheet and a method of manufacturing the same.

More specifically, in an exemplary embodiment of the present invention, it is intended to provide a continuous annealing type enamel steel sheet for processing that does not cause bubble defects after enamel treatment and has excellent enamel adhesion and fishscale resistance, and a method of manufacturing the same.

Technical Solution

An exemplary embodiment of the present invention provides an enamel steel sheet, including: by wt % (% by weight), 0.01 to 0.05% of C, 0.05 to 0.8% of Mn, 0.001 to 0.03% of Si, 0.03 to 0.12% of Al, 0.001 to 0.02% of P, 0.001 to 0.02% of S, 0.004% or less (excluding 0%) of N, 0.001 to 0.003% of B, 0.003% or less (excluding 0%) of O, and the balance of Fe and inevitable impurities.

The enamel steel sheet according to an exemplary embodiment of the present invention may satisfy Equation 1 below.

The enamel steel sheet according to an exemplary embodiment of the present invention may satisfy Equation 1 below.

$$0.002 \leq (1.4 \times [B] \times [Al])/[N] \leq 0.0095 \quad \text{[Equation 1]}$$

(In Equation 1, [B], [Al], and [N] represent the contents (atomic %) of B, Al and N, respectively.)

The oxide layer may include 90 wt % or more of Fe oxide.

In the enamel steel sheet according to an exemplary embodiment of the present invention, a cementite fraction difference (Cv) calculated by Equation 2 below may be 0.8 to 2.5%.

$$CV = C_{1/2t} - C_{1/8t} \quad \text{[Equation 2]}$$

(In Equation 2, $C_{1/2t}$ and $C_{1/8t}$ represent the cementite fraction in a center and a ⅛ site in a thickness direction of the steel sheet, respectively.)

In the enamel steel sheet according to an exemplary embodiment of the present invention, a micropore area ratio difference (MVv) for each site calculated by Equation 3 may be 0.075 to 0.155%.

$$MVv = MV_{1/8t} - MV_{Av} \quad \text{[Equation 3]}$$

(In Equation 3, $MV_{1/8t}$ and $MV_{Av}$ represent a ⅛ site and an average micropore fraction in a thickness direction, respectively.)

The enamel steel sheet according to an exemplary embodiment of the present invention may further include one or more of 0.01 wt % or less of Cu, and 0.005 wt % or less of Ti.

In the enamel steel sheet according to an exemplary embodiment of the present invention, enamel adhesion may be 95% or greater.

In the enamel steel sheet according to an exemplary embodiment of the present invention, a hydrogen permeation ratio may be 600 sec/mm² or greater.

Another exemplary embodiment of the present invention provides a method of manufacturing an enamel steel sheet, including: manufacturing a hot-rolled steel sheet by hot rolling a slab including, by wt %, 0.02 to 0.08% of C, to 0.8% of Mn, 0.001 to 0.03% of Si, 0.03 to 0.12% of Al, 0.001 to 0.02% of P, 0.001 to 0.02% of S, 0.004% or less (excluding 0%) of N, 0.001 to 0.003% of B, 0.003% or less (excluding 0%) of O, and the balance of Fe and inevitable impurities; manufacturing a cold-rolled steel sheet by cold rolling the hot-rolled steel sheet; and annealing the cold-rolled steel sheet.

In the annealing, heat treatment may be performed for 20 seconds to 180 seconds in a wet atmosphere having an oxidation capacity index ($PH_2O/PH_2$) of 0.51 to 0.65.

The slab may satisfy Equation 1 below.

$$0.002 \leq (1.4 \times [B] \times [Al])/[N] \leq 0.0095 \quad \text{[Equation 1]}$$

(In Equation 1, [B], [Al], and [N] represent the contents (atomic %) of B, Al and N, respectively.)

The slab may be hot-rolled at a finishing rolling temperature of 850° C. to 910° C.

In the manufacturing of the hot-rolled steel sheet, the hot-rolled steel sheet may be wound at 580° C. to 720° C.

In the manufacturing of the cold-rolled steel sheet, the cold rolling may be performed at a reduction ratio of 60 to 90%.

In the annealing of the cold-rolled steel sheet, the annealing may be performed at 720° C. to 850° C.

The method may further include temper rolling at a reduction ratio of 3% or less after the annealing of the cold-rolled steel sheet.

Advantageous Effects

The enamel steel sheet having excellent fishscale resistance and enamel adhesion according to an exemplary embodiment of the present invention can be used for home appliances, chemical equipment, kitchen equipment, sanitary equipment, interior and exterior materials of buildings, and the like.

In the enamel steel sheet having excellent fishscale resistance and enamel adhesion according to an exemplary embodiment of the present invention, a chemical composition of a steel material is suppressed within an appropriate range, and at the same time, an adhesion relationship index is controlled. Therefore, it is possible to allow a manufactured cold-rolled steel sheet to secure high enamel adhesion. In addition, by controlling the fractions of carbides and micropores in the surface layer and the center to suppress the fishscale and bubble defects, which are fatal defects of an enamel steel sheet, it is possible to remarkably improve the enamel properties.

In the enamel steel sheet having excellent fishscale resistance and enamel adhesion according to an exemplary embodiment of the present invention, it is possible to improve productivity and operability by using low-carbon steel with excellent surface properties in the range of 0.02 to 0.08% by weight of C during steelmaking, and when heat-treating a thin sheet subjected to cold rolling in a continuous annealing furnace, by optimizing furnace atmosphere to control a carbide fraction in steel in a thickness direction, it is possible to significantly improve enamel properties even during a high-speed heat treatment operation.

In the enamel steel sheet having excellent fishscale resistance and enamel adhesion according to an exemplary embodiment of the present invention, it is possible to promote a decarburization reaction through atmosphere control in a continuous annealing process using cementite that is a low-temperature precipitate. Cementite is present uniformly dispersed during hot rolling, and micropores formed by cold rolling and decarburization reaction act as a hydrogen occlusion source to prevent a fishscale defect that is caused by hydrogen. Meanwhile, residual carbon or the like in the surface layer of the steel sheet acts as a factor of causing bubble defects in an enamel product due to a gasification reaction during enamel firing. Therefore, according to an exemplary embodiment of the present invention, by controlling distributions of carbides and micropores in a thickness direction of a cold-rolled steel sheet, it is possible to improve enamel properties and to prevent the occurrence of surface bubble defects.

MODE FOR INVENTION

Figure 1:
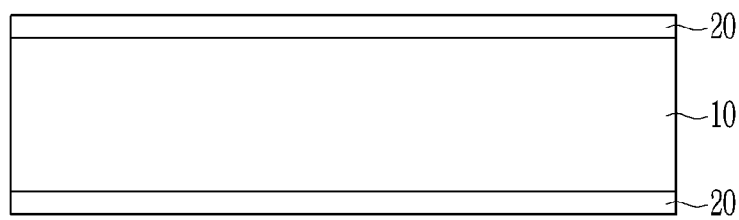
FIG. 1 is a schematic diagram of a cross section of an enamel steel sheet according to an exemplary embodiment of the present invention.

In the present specification, the terms such as first, second and third are used for describing, but are not limited to, various parts, components, regions, layers, and/or sections. These terms are used only to discriminate one part, component, region, layer or section from another part, component, region, layer or section. Therefore, a first part, component, region, layer or section described below may be referred to as a second part, component, region, layer or section without departing from the scope of the present invention.

In the present specification, unless explicitly described to the contrary, when a part "includes", "comprises" or "has" a certain constituent element, this does not mean that another constituent element is excluded, but means that another constituent element may be further included.

In the present specification, terminologies used herein are to mention only a specific exemplary embodiment, and are not intended to limit the present invention. Singular forms used herein are intended to include the plural forms as long as phrases do not clearly indicate an opposite meaning. In the present specification, the term "including" is intended to embody specific characteristics, regions, integers, steps, operations, elements and/or components, but is not intended to exclude presence or addition of other characteristics, regions, integers, steps, operations, elements, and/or components.

In the present specification, the term "combination of these" included in the expression of the Markush format means one or more mixtures or combinations selected from the group consisting of the constituent elements described in the expression of the Markush format, and means including one or more selected from the group consisting of the constituent elements.

In the present specification, when a part is referred to as being "above" or "on" another part, it may be directly above or on the other part or an intervening part may also be present therebetween. In contrast, when a part is referred to as being "directly above" another part, there is no intervening part present.

Unless otherwise defined, all terms including technical and scientific terms used herein have the same meanings as the meanings generally understood by one skilled in the art to which the present invention pertains. Terms, such as those defined in commonly used dictionaries, are to be interpreted as having meanings consistent with the relevant technical literature and the present disclosure, and are not to be interpreted as having idealized or overly formal meanings unless expressly so defined herein.

In addition, unless otherwise specified, % means wt % (% by weight), and 1 ppm is 0.0001 wt %.

In an exemplary embodiment of the present invention, further including an additional element means that the balance of iron (Fe) is replaced and included as much as an additional amount of the additional element.

Hereinafter, an exemplary embodiment of the present invention will be described in detail so that one skilled in the art to which the present invention pertains can easily implement the present invention. As those skilled in the art would realize, the described embodiments may be modified in various different ways, all without departing from the spirit or scope of the present invention.

An exemplary embodiment of the present invention provides an enamel steel sheet, including: by wt % (% by weight), 0.01 to 0.05% of C, 0.05 to 0.8% of Mn, 0.001 to 0.03% of Si, 0.03 to 0.12% of Al, 0.001 to 0.02% of P, 0.001 to of S, 0.004% or less (excluding 0%) of N, 0.001 to 0.003% of B, 0.003% or less (excluding 0%) of O, and the balance of Fe and inevitable impurities.

First, the reason for limiting the components of the steel sheet will be described.

C: 0.01 to 0.05% by weight

When carbon (C) is added too much, an amount of dissolved carbon in steel increases, which increases strength, interferes with texture development during annealing, deteriorates formability, and causes bubble defects due to enamel layer bubbling. On the other hand, when C is too small, a fraction of carbides acting as sites in steel where hydrogen is occluded decreases, so there is a problem that the steel is vulnerable to a fishscale defect.

Carbon in a slab may be included in an amount of 0.02 to 0.08% by weight. More specifically, carbon in the slab may be included in an amount of to 0.076% by weight.

Regarding a manufacturing process to be described later, since decarburization is performed in a high oxidation capacity index atmosphere during a final annealing process, the C content in the slab and the C content in the final steel sheet may be different from each other. Since the decarburization is performed by about 0.01 to 0.05% by weight, the C content in the final steel sheet may be 0.01 to 0.05% by weight. The C content in the final steel sheet may have a concentration gradient in a thickness direction, and the above-described C content represents an average of the C content in an entire steel sheet 100 including an oxide layer 20. More specifically, the C content in the final steel sheet may be 0.015 to 0.045% by weight.

Mn: 0.05 to 0.80% by weight

Manganese (Mn) is a representative solid solution strengthening element, and precipitates sulfur dissolved in steel in the form of manganese sulfide (MnS) to prevent hot shortness and to promote carbide precipitation. When Mn is added too little, it is difficult to sufficiently obtain the above-described effect. On the other hand, when the content of Mn is too large, formability is deteriorated and Ar3 transformation temperature is lowered, which may cause a problem in that transformation occurs during enamel firing and deformation occurs. Therefore, Mn may be included in an amount of 0.05 to by weight. More specifically, Mn may be included in an amount of 0.05 to 0.60% by weight. More specifically, Mn may be included in an amount of 0.10 to 0.40% by weight.

Si: 0.001 to 0.03% by weight

Silicon (Si) is an element that promotes formation of carbides acting as a hydrogen occlusion source. When Si is added too little, it is difficult to sufficiently obtain the above-described effect. On the other hand, when Si is added too much, an oxide film is formed on the surface of the steel sheet, which may cause a problem of lowering enamel adhesion. Therefore, Si may be included in an amount of 0.001 to 0.030% by weight. More specifically, Si may be included in an amount of 0.002 to 0.027% by weight.

Al: 0.03 to 0.12% by weight

Aluminum (Al) is used as a powerful deoxidizer to remove oxygen in molten steel during steelmaking, and is an element that improves aging properties by fixing dissolved nitrogen. When Al is added too little, it is difficult to sufficiently obtain the above-described effect. On the other hand, when Al is added too much, aluminum oxide may remain in the steel or on the surface of the steel, thereby causing the problem of bubble defects such as blisters in the enamel treatment process. Therefore, Al may be included in a range of 0.03 to by weight. More specifically, Al may be included in an amount of 0.035 to 0.115% by weight.

P: 0.001 to 0.020% by weight

Phosphorus (P) is a representative material strengthening element. When P is added too little, it is difficult to sufficiently obtain the above-described effect. On the other hand, when P is added too much, it not only deteriorates the formability by forming a segregation layer inside the steel sheet, but also deteriorates the pickling property of the steel, which may adversely affect the enamel adhesion. Therefore, P may be included in a range of 0.001 to 0.020% by weight. More specifically, P may be included in an amount of 0.002 to by weight.

S: 0.001 to 0.020% by weight

Sulfur (S) is an element that combines to manganese to cause hot shortness. When S is added too little, a problem of worsening weldability may occur. When S is added too much, ductility is greatly reduced, which not only deteriorates workability, but also excessively precipitates manganese sulfide, which may adversely affect the fishscale properties of the product. Therefore, S may be included in an amount of 0.001 to 0.020% by weight. More specifically, S may be included in an amount of 0.002% to 0.018% by weight.

N: 0.004% by weight or less

Nitrogen (N) is a representative hardening element, but when the amount added increases, the problem of causing the aging defects frequently, deteriorating the formability, and causing the bubble defects in the enamel treatment process may occur. Therefore, the upper limit of N is limited to by weight. More specifically, N may be included in an amount of to 0.0037% by weight.

B: 0.001 to 0.003%

Boron (B) combines with nitrogen in steel to form nitride, thereby suppressing aging caused by dissolved nitrogen. In addition, these precipitates serve as an occlusion source of hydrogen in steel. B is an element that is also effective in improving fishscale resistance, and needs to be added in an amount of 0.001% by weight or more in order to exert such an effect. However, when B is added too much, the material is hardened and the annealing workability is deteriorated. Therefore, the upper limit of B may be limited to 0.003% by weight. More specifically, B may be included in an amount of 0.0013 to 0.0027% by weight.

O: 0.003% by weight or less

Oxygen (O) is an essential element in forming oxides, and such oxides act as a factor that not only causes a dissolution loss of refractories during the steelmaking, but also causes surface defects due to oxides on the surface during steel sheet manufacturing. Therefore, the amount of O added in the slab may be 0.003% by weight or less. More specifically, the slab may include to 0.0019% by weight of O.

Regarding a manufacturing process to be described later, in the final annealing process, decarburization is performed in a high oxidation capacity index atmosphere to allow some oxygen to permeate, thereby forming the oxide layer 20. However, since a thickness of the oxide layer 20 is very thin, as compared with a thickness of the entire steel sheet 100, there is substantially no variation in the amount of oxygen in the entire steel sheet 100. 5% by weight or more of oxygen is included in the oxide layer 20. More specifically, 10 to 50% by weight of O may be included in the oxide layer 20. The oxygen content in the oxide layer 20 means an average content of oxygen in the oxide layer 20.

The cold-rolled enamel steel sheet according to an exemplary embodiment of the present invention may satisfy Equation 1 below.

$$0.002 \leq (1.4 \times [B] \times [Al])/[N] \leq 0.0095 \quad \text{[Equation 1]}$$

(In Equation 1, [B], [Al], and [N] represent the contents (atomic %) of B, Al and N, respectively.)

Aluminum and boron in steel react with nitrogen to form nitrides, thereby improving workability. Therefore, it is necessary to consider the reactivity with nitrogen in combination as well as each element. In this case, since boron reacts with nitrogen prior to aluminum, it is necessary to manage an atomic ratio defined in Equation 1 to 0.0020 to 0.0095. When the atomic ratio is too low, workability may be deteriorated due to an increase in amount of dissolved nitrogen remaining in steel. Conversely, when the atomic ratio is too high, problems such as deterioration in workability and annealing pass-through ability due to material hardening may occur. More specifically, the value of Equation 1 may be 0.0025 to 0.0090.

In addition to the above components, the present invention includes Fe and inevitable impurities. In addition to the above components, addition of effective components is not excluded. Examples of the inevitable impurities may include Cu, Ti, and the like. In an exemplary embodiment of the present invention, Cu and Ti are not intentionally added, Cu may be included in an amount of 0.01% by weight or less, and Ti may be included in an amount of by weight or less.

Next, the reason for limiting the volume fractions of steel sheet micropores and carbides in the hot rolling step of the present invention will be described. The carbide used in the steel of the present invention not only forms micropores by being crushed itself in the cold rolling process due to the difference in ductility with the base material or by subsequent decarburization heat treatment, but also is used itself as a hydrogen occlusion source that fixes hydrogen in the steel. Therefore, such a carbide fraction affects the enamel properties not only by itself but also by the interrelationship with the additive element. The enamel steel sheet proposed in the present invention actively utilizes not only carbides such as $Fe_3C$ (cementite) but also micropores due to decarburization as a location of hydrogen occlusion by controlling the steel components, and the present invention provides an enamel steel sheet and its products with excellent enamel adhesion and fishscale resistance without surface defects by controlling components and processes that affect enamel adhesion, surface defects and the like among steel components. The cementite uniformly dispersed and precipitated during the hot rolling is crushed during the cold rolling, and also acts as a decarburization reaction source through atmosphere control during the annealing to form micropores that are a hydrogen occlusion source, which may effectively fix hydrogen in the steel to suppress the fishscale defect. By controlling the carbide and micropore fractions in the thickness direction by continuous annealing decarburization, and also controlling the oxide behavior of the steel sheet surface layer, it had a great effect in the enamel adhesion and in suppressing bubble defects. On the other hand, unlike the high-temperature precipitation/inclusion system that is precipitated in the high-temperature solidification process, in an exemplary embodiment of the present invention, stable carbide is used at low temperature, thereby preventing the deterioration in workability of an operation such as the dissolution loss of refractories or the clogging of the continuous casting nozzle and the surface defects such as blackline, which were problematic in the existing enamel steel. The carbide fraction has a close relationship with the total carbon content in the steel and is also greatly affected by operating conditions. On the other hand, in the case of the steel of the present invention, not only elements such as titanium (Ti), which have a higher oxidation property than iron (Fe), are not added, but also the surface oxide layer is controlled, so that the enamel adhesion between the steel sheet and the glaze can be greatly improved.

FIG. 1 shows a schematic diagram of a cross section of an enamel steel sheet according to an exemplary embodiment of the present invention. As shown in FIG. 1, an oxide layer 20 is included in an inside direction from a surface of a steel sheet. The oxide layer 20 is distinguished from a steel sheet substrate 10 including less than 5% by weight of oxygen (O)

in that the oxide layer 20 includes 5% by weight or more of oxygen (O). Specifically, for the cross section of the steel sheet, when analyzing the oxygen concentration in the inside direction from the surface, the oxide layer 20 and the substrate 10 are divided based on a point where 5% by weight of oxygen is included. When there are a plurality of points where 5% by weight of oxygen is included, the oxide layer and the substrate are divided based on the innermost point as a starting point.

The oxide layer 20 may include 90% by weight or more of Fe oxide. Since an enamel product is a product with organic glaze applied on a steel sheet, it is very important to secure adhesion between the steel sheet and the glaze. In general, the main component of the glaze is made of silicon oxides ($SiO_2$), and in order to prevent the deterioration in the adhesion with the steel sheet, an expensive glaze containing a large amount of NiO among the glaze components is often applied.

In an exemplary embodiment of the present invention, a method for improving the enamel adhesion by controlling the thickness of the oxide layer on the surface of the steel sheet was confirmed through repeated experiments. The enamel adhesion was improved by controlling the thickness of the oxide layer mainly composed of FeO in a certain range to promote covalent bonding with silicon (Si) atoms in the glaze layer. To this end, it is necessary to control the thickness of the oxide layer to 0.006 to 0.030 μm. When the thickness of the oxide layer is too thin, the bonding strength between the glaze layer and the steel sheet is low, making it difficult to secure enamel adhesion. On the other hand, when the thickness of the oxide layer is too thick, it is advantageous in terms of the adhesion, but there is a problem in that the surface properties of the steel sheet are deteriorated. Therefore, the thickness of the oxide layer 20 on the surface of the steel sheet was limited to 0.006 to 0.030 μm. More specifically, the oxide layer 20 may have a thickness of 0.007 to 0.028 μm. The thickness of the oxide layer 20 may be different throughout the steel sheet 100, and in an exemplary embodiment of the present invention, the thickness of the oxide layer 20 means an average thickness of the entire steel sheet 100.

In the enamel steel sheet according to an exemplary embodiment of the present invention, a cementite fraction difference (Cv) calculated by Equation 2 below may be 0.8 to 2.5%.

$$CV = C_{1/2t} - C_{1/8t}$$ [Equation 2]

(In Equation 2, $C_{1/2t}$ and $C_{1/8t}$ represent the cementite fraction in a center and a ⅛ site in a thickness direction of the steel sheet, respectively.)

Carbon present in the metal alloy is combined with metal atoms to form carbides, and one of the carbides formed at a relatively low temperature by combining iron with carbon is cementite. Usually, in the carbon steel, the cementite is formed between 250 and 700° C., and is coarsened into spherical particles at a higher temperature than the above temperature. The cementite generated in the hot rolling process is crushed in the cold rolling process and decomposed in the decarburization process to act as a hydrogen occlusion source. However, when these cementites are intensively present on the surface of the steel, these cementites become a source that promotes the gasification reaction of carbon during the enamel firing, which becomes a factor that causes bubble defects. Therefore, it is necessary to strictly control the carbide volume fraction in the thickness direction in order to suppress the fishscale and bubble defects of the enamel products. That is, when the cementite fraction difference Cv in the thickness direction of the cold-rolled steel sheet is too small, the carbide fraction in the surface layer increases as the decarburization reaction does not proceed smoothly, which acts as a factor that causes the bubble defects after the enamel firing. On the other hand, when Cv is too large, there is a problem in that it is difficult to suppress the occurrence of the fishscale defect because the supply of sites capable of occluding hydrogen in the steel is insufficient. Therefore, the cementite fraction difference Cv in the thickness direction may be 0.8 to 2.5%. More preferably, Cv may be 0.85 to 2.45%.

In the enamel steel sheet according to an exemplary embodiment of the present invention, a micropore area ratio difference (MVv) for each site calculated by Equation 3 below may be 0.075 to 0.155%.

$$MVv = MV_{1/8t} - MV_{Av}$$ [Equation 3]

(In Equation 3, $MV_{1/8t}$ and $MV_{Av}$ represent a ⅛ site and an average micropore fraction in a thickness direction, respectively.)

The cementite precipitated during the hot rolling is crushed during the cold rolling and the decarburization heat treatment to form micropores around them. The formed micropores act as a hydrogen occlusion source to suppress the occurrence of the fishscale defect. For the micropores in the cold-rolled steel sheet, after taking 10 photos with a magnification of 1000 times the surface parallel to the rolling surface (ND surface) using a scanning electron microscope, the area fraction of the micropores occupied in these areas was measured using an image analyzer. In an exemplary embodiment of the present invention, it was confirmed that there is a region capable of simultaneously suppressing the fishscale and bubble defects by controlling the distribution of the area ratio of these micropores for each site. In order to secure such an effect, it was necessary to control the micropore area ratio difference MVv to 0.075 to 0.155%. When the micropore area ratio difference MVv is too small, it is advantageous in terms of the fishscale resistance, but the problems with the deterioration in workability and the frequent occurrence of the surface defects such as the bubble defects may occur. On the other hand, when the MVv is too large, there are few sites that act as the hydrogen occlusion source that can fix hydrogen in the steel, so there may occur a problem in that the fishscale defect rate of the product increases. Therefore, the micropore area ratio difference MW was limited to 0.075 to 0.155%. More specifically, MVv may be 0.080 to 0.150%.

The enamel adhesion of the enamel steel sheet according to an exemplary embodiment of the present invention may be 95% or greater. By satisfying these properties, the steel sheet may be applied as a material for enamel even when a relatively inexpensive glaze is used. When the enamel adhesion is too low, since the glaze layer is dropped out during the distribution or handling after the enamel treatment and the merchantability as the enamel material is lowered, an enamel company applies an expensive glaze added with a large amount of a component such as NiO, considering the stability, which acts as a factor of increasing the cost. Therefore, efforts are being made to propose a method of securing enamel adhesion even with low-cost glaze. In general, when the enamel adhesion is 90% or greater, it is classified as the best enamel product, but in an exemplary embodiment of the present invention, a method for securing enamel adhesion of 95% or greater is proposed. In addition, when the enamel adhesion is lowered, the fishscale generation rate by hydrogen also increases in steel, so it is preferable to secure as high adhesion as possible. In the present invention, the enamel adhesion of 95% or greater excellent in the adhesion and fishscale control was secured. More specifically, the enamel adhesion may be 96% or greater. The enamel adhesion refers to a numerical value expressed by indexing the drop out degree of the enamel glaze layer by applying a certain load to the enamel layer with a steel ball and then evaluating the degree of energization at the corresponding portion, as defined in the American Society for Testing and Materials standard, ASTM C313-78.

The enamel steel sheet according to an exemplary embodiment of the present invention may have a hydrogen permeation ratio of 600 sec/mm$^2$ or greater. The hydrogen permeation ratio is a representative index for evaluating fishscale resistance indicating resistance to the fishscale defect, which is a fatal defect, when applying the enamel steel manufactured using the cold-rolled steel sheet according to an exemplary embodiment of the present invention, and evaluates the ability to fix hydrogen in the steel sheet by the method listed in European standard (EN10209). A value obtained by generating hydrogen from one direction of the steel sheet, measuring a time ($t_s$, unit: second) for hydrogen to permeate into an opposite side of the steel sheet and dividing the time by a square of the material thickness (t, unit: mm) is expressed as $t_s/t^2$ (unit: sec/mm$^2$). If the hydrogen permeation ratio is too low, when resistance to the fishscale defect is evaluated by the accelerated heat treatment at 200° C. for 24 hours after the enamel treatment, the defect rate is over 50%, and thus, there is a problem in using the steel sheet as a stable enamel product. Therefore, in order to secure the steel sheet with the excellent fishscale resistance, it is necessary to control the hydrogen permeation ratio to 600 sec/mm$^2$ or greater. In addition, more specifically, the hydrogen permeation ratio may be 610 sec/mm$^2$ or greater.

Another exemplary embodiment of the present invention provides a method of manufacturing an enamel steel sheet, including: manufacturing a hot-rolled steel sheet by hot rolling a slab including, by wt %, 0.02 to 0.08% of C, to 0.8% of Mn, 0.001 to 0.03% of Si, 0.03 to 0.12% of Al, 0.001 to 0.02% of P, 0.001 to 0.02% of S, 0.004% or less (excluding 0%) of N, 0.001 to 0.003% of B, 0.003% or less (excluding 0%) of O, and the balance of Fe and inevitable impurities; manufacturing a cold-rolled steel sheet by cold rolling the hot-rolled steel sheet; and annealing the cold-rolled steel sheet.

First, a slab satisfying the above-described composition is prepared. The molten steel whose components are adjusted to the above-described composition in the steelmaking process may be manufactured into a slab through continuous casting. As described above, in the process of annealing the cold-rolled steel sheet, the contents of C and O are partially changed, and other alloy components are substantially the same as the above-described enamel steel sheet. Since the alloy components have been described above, overlapping descriptions thereof will be omitted.

Thereafter, the manufactured slab is heated. By heating, the subsequent hot rolling process may be smoothly performed, and the slab may be homogenized. More specifically, heating may mean reheating.

In this case, the slab heating temperature may be 1150 to 1280° C. When the slab heating temperature is too low, the rolling load may increase rapidly in the subsequent hot rolling process, which may lower workability. On the other hand, when the slab heating temperature is too high, not only the energy cost increases, but also the amount of surface scale increases, which may lead to material loss. More specifically, the slab heating temperature may be 1180 to 1260° C.

Thereafter, the heated slab is hot-rolled to manufacture a hot-rolled steel sheet.

In this case, the finishing rolling temperature of the hot rolling may be 850 to 910° C. When the finishing hot rolling temperature is too low, as the rolling is finished in the low temperature region, grain mixing proceeds rapidly, which may lead to the deterioration in rollability and workability. On the other hand, when the finishing hot rolling temperature is too high, the peelability of the surface scale is deteriorated, and the impact toughness may be lowered due to grain growth as the uniform hot rolling is not performed throughout the thickness. More specifically, the finishing hot rolling temperature may be 860 to 900° C.

Thereafter, the hot-rolled steel sheet manufactured after the hot rolling is finished is subjected to a winding process. More specifically, the winding process may be a hot-rolled winding process.

In this case, the winding temperature may be 580 to 720° C. The hot-rolled steel sheet may be cooled in a run-out-table (ROT) before winding. When the hot rolling winding temperature is too low, the temperature non-uniformity in the width direction occurs in the cooling and maintaining process, which not only causes material deviation as the formation of low-temperature precipitates is changed, but also adversely affects the enamel properties. On the other hand, when the winding temperature is too high, as the agglomeration of the carbide progresses, there is a problem in that the corrosion resistance is lowered, the grain boundary segregation of P is promoted to lower the cold rollability, and the workability is lowered due to coarsening of the structure in the final product. More specifically, the winding temperature may be 590 to 710° C.

The wound hot-rolled steel sheet may be further subjected to pickling of the steel sheet before the cold rolling.

Thereafter, the wound hot-rolled steel sheet is manufactured into a cold-rolled steel sheet through the cold rolling.

In this case, the cold reduction ratio may be 60 to 90%. When the cold reduction ratio is too low, the recrystallization driving force in the subsequent heat treatment process is not secured, so non-recrystallized grains remain locally, which increases the strength but significantly reduces the workability. In addition, as the crushing ability of the carbide formed in the hot-rolling process is lowered, the number of sites that may occlude hydrogen is reduced to make it difficult to secure the fishscale resistance, and considering the thickness of the final product, the thickness of the hot-rolled sheet should be lowered, so there is a problem that the rolling workability is also lowered. On the other hand, when the cold reduction ratio is too high, the material is hardened and the workability is deteriorated, as well as the load of the rolling mill increases, which deteriorates the operability. More specifically, the cold reduction ratio may be 63 to 88%.

Thereafter, the cold-rolled steel sheet is manufactured into an enamel steel sheet through continuous annealing heat treatment. The cold-rolled material has high strength due to high deformation applied in the cold rolling, but has extremely poor workability, so the workability and decarburization reaction are secured by performing atmospheric heat treatment in the subsequent process.

In the process of heat-treating the cold-rolled steel sheet, in an exemplary embodiment of the present invention, the oxidation capacity ($PH_2O/PH_2$) condition is controlled so that the diffusion rate of carbon atoms is optimal to promote external diffusion of carbon atoms in the material, thereby improving decarburization properties. To this end, as a standard for optimization management of the decarburization annealing process, the decarburization temperature is set to a range of 720 to 850° C., and heat treatment is performed in a wet atmosphere having the oxidation capacity ($PH_2O/PH_2$) of 0.51 to 0.65. In this case, the appropriate holding time is 20 to 180 seconds.

In this case, the heat treatment temperature may be 720 to 850° C. When the decarburization annealing temperature is too low, as the deformation formed by the cold rolling is not sufficiently removed, the workability is significantly reduced, and the decarburization rate by the atmospheric heat treatment is too low, so the desired characteristics of the cold-rolled enamel steel sheet may not be secured. On the other hand, when the heat treatment temperature is too high, not only the annealing pass-through ability by sheet breakage is lowered due to softening caused by the deterioration in the high temperature strength, but also the decarburization reaction is suppressed by the increase in the thickness of the surface oxide layer. Therefore, the heat treatment temperature was limited to 720 to 850° C. More preferably, the annealing temperature may be 730 to 840° C.

In this case, the oxidation capacity ($PH_2O/PH_2$) of the heat treatment atmosphere may be 0.51 to 0.65. When the oxidation capacity is too low, it takes a long time for decarburization, and thus, the decarburization is lowered during the continuous annealing, so it may be difficult to secure the enamel properties. On the other hand, when the oxidation capacity is too high, there is a problem in that the occurrence rate of the surface defects due to the surface film formed by peroxidation is high. Therefore, the oxidation capacity of the atmospheric gas was limited to 0.51 to 0.65. More specifically, the oxidation capacity may be 0.52 to 0.64.

In addition, the soaking holding time in the atmospheric continuous annealing process may be 20 to 180 seconds. Even when the soaking time at the holding temperature is too short, non-recrystallized grains remain, which greatly deteriorates the formability, and the decarburization reaction in the thickness direction does not work smoothly, which acts as a factor that lowers the enamel property. On the other hand, when the holding time is too long, abnormal grain growth occurs due to the decarburization reaction, and thus, there is a problem of deterioration in workability due to material non-uniformity and deterioration in fishscale properties. Accordingly, the holding time at the soaking temperature may be 20 to 180 seconds. More preferably, the holding time may be 25 seconds to 160 seconds.

In addition, the process of temper rolling the heat-treated steel sheet after annealing the cold-rolled steel sheet may be further included. Through the temper rolling, the shape of the material may be controlled, and the desired surface roughness may be obtained. However, when the temper reduction ratio is too high, since there is a problem in that the material is hardened by work hardening and the workability is lowered, the reduction ratio of the temper rolling may be 3% or less. Specifically, the reduction ratio of the temper rolling may be 0.3 to 2.5%.

Hereinafter, the present invention will be described in more detail with reference to examples. However, it should be noted that the following examples are only for illustrating the present invention in more detail and are not intended to limit the scope of the present invention. This is because the scope of the present invention is determined by the matters described in the claims and matters reasonably inferred therefrom.

EXAMPLES

A slab was prepared through a converter-second refining-continuous casting process with an alloy component including, by wt %, the composition of Table 1 below and the balance of iron (Fe) and inevitable impurities. This slab was maintained in a heating furnace at 1200° C. for 1 hour, and then subjected to hot rolling. In this case, the final thickness of the hot-rolled steel sheet was 4.0 mm. The hot-rolled specimen was subjected to cold rolling with a reduction ratio after removing an oxide film on a surface through pickling treatment. The specimens subjected to the cold rolling were processed into a specimen for enamel treatment to investigate enamel properties and a specimen for mechanical property analysis, and were subjected to heat treatment. The finishing hot rolling temperature, winding temperature, cold reduction ratio, annealing temperature, holding time, and oxidation capacity are summarized in Table 2 below.

Table 3 below shows operability, enamel property, tissue properties, and the like of materials obtained through the above process for each manufacturing condition.

In the case of pass-through ability, "O" indicates operability of 90% or higher, as compared with productivity of normal materials in the continuous casting, hot rolling, and cold rolling processes, and "X" indicates that productivity is 90% or less or the defect occurrence rate is 10% or higher.

The carbide fraction was obtained as the carbide fraction for the entire viewing area by using an image analyzer after securing an image of 20 fields of view with a magnification of 500 times with an optical microscope.

The specimen for enamel treatment was cut to an appropriate size for each application to meet the purpose of the test. After the specimen for enamel treatment heat-treated was completely degreased, the specimen was applied with a standard glaze (check frit) which is relatively vulnerable to the fishscale defects, and maintained at 300° C. for 10 minutes to remove moisture. The dried specimen was fired at a relatively low 800° C. for 20 minutes in order to highlight the differences in enamel properties such as adhesion, and then cooled to room temperature. In this case, an atmospheric condition of a firing furnace was a dew point temperature of 30° C., which is a harsh condition where fishscale defects easily occur. The specimen subjected to the enamel treatment was subjected to a fishscale acceleration test in which the specimen was maintained in an oven at 200° C. for 24 hours.

After the fishscale acceleration treatment, the presence or absence of the fishscale defect was observed with the naked eye, and the case in which the fishscale defect did not occur was denoted by "O" and the case in which fishscale defect occurred was denoted by "X".

The enamel adhesion, which evaluated the adhesion between the steel sheet and the glaze was indicated by indexing the drop out degree of the enamel glaze layer by applying a certain load to the enamel layer with a steel ball and then evaluating the degree of energization at the corresponding portion, as defined in the American Society for Testing and Materials standard, ASTM C313-78. In the present invention, in the case of the enamel adhesion, the goal was to secure 95% or greater in terms of securing application stability in relatively inexpensive glazes.

The enamel surface was observed with the naked eye on the specimen maintained in the oven at 200° C. for 24 hours after the enamel treatment, and the bubble defects were determined to be "0" excellent, "A" normal, and "X" bad, respectively.

The hydrogen permeation ratio is one of the indices for evaluating the resistance to the fishscale, which is a fatal defect of the enamel, and is represented by $t_s/t^2$ (unit, sec/mm$^2$) which is a value obtained by generating hydrogen from one direction of the steel sheet and measuring a time ($t_s$, unit: second) for hydrogen to permeate into an opposite side and dividing the time by a square of the material thickness (t, unit: mm) according to an experimental method indicated in the European standard (EN10209-2013).

TABLE 1

| Classification | C | Mn | Si | Al | P | S | N | B | O | Ti | Value of Equation 1 |
|---|---|---|---|---|---|---|---|---|---|---|---|
| Inventive Steel 1 | 0.031 | 0.12 | 0.014 | 0.055 | 0.011 | 0.011 | 0.0019 | 0.0018 | 0.0012 | — | 0.0034 |
| Inventive Steel 2 | 0.052 | 0.35 | 0.008 | 0.084 | 0.013 | 0.014 | 0.0025 | 0.0014 | 0.0009 | — | 0.0031 |
| Inventive Steel 3 | 0.042 | 0.24 | 0.018 | 0.072 | 0.008 | 0.010 | 0.0017 | 0.0025 | 0.0010 | — | 0.0070 |
| Inventive Steel 4 | 0.057 | 0.18 | 0.024 | 0.091 | 0.009 | 0.006 | 0.0023 | 0.0016 | 0.0017 | — | 0.0042 |
| Inventive Steel 5 | 0.069 | 0.27 | 0.011 | 0.068 | 0.007 | 0.009 | 0.0031 | 0.0027 | 0.0008 | — | 0.0039 |
| Comparative Steel 1 | 0.002 | 0.15 | 0.008 | 0.062 | 0.012 | 0.048 | 0.0029 | — | 0.0016 | 0.975 | 0 |
| Comparative Steel 2 | 0.032 | 0.23 | 0.012 | 0.002 | 0.007 | 0.007 | 0.0018 | 0.0015 | 0.0388 | — | 0.0001 |
| Comparative Steel 3 | 0.047 | 0.34 | 0.024 | 0.024 | 0.010 | 0.012 | 0.0076 | 0.0014 | 0.0012 | — | 0.0003 |
| Comparative Steel 4 | 0.094 | 0.82 | 0.004 | 0.066 | 0.015 | 0.004 | 0.0025 | — | 0.0018 | — | 0 |
| Comparative Steel 5 | 0.056 | 0.31 | 0.0342 | 0.154 | 0.011 | 0.021 | 0.0027 | 0.0036 | 0.0012 | 0.046 | 0.0136 |

TABLE 2

| Classification | Steel type No. | Finishing hot rolling temperature (° C.) | Winding temperature (° C.) | Cold rolling reduction ratio (%) | Annealing temperature (° C.) | Holding Time (sec) | Oxidation capacity ($P_{H2O}/P_{H2}$) | Oxide layer thickness (μm) | Amount of C after decarburization (wt %) |
|---|---|---|---|---|---|---|---|---|---|
| Inventive Example 1 | Inventive Steel 1 | 890 | 680 | 84 | 760 | 120 | 0.53 | 0.018 | 0.015 |
| Inventive Example 2 | Inventive Steel 1 | 890 | 680 | 84 | 780 | 90 | 0.53 | 0.021 | 0.014 |
| Inventive Example 3 | Inventive Steel 1 | 890 | 680 | 84 | 820 | 60 | 0.53 | 0.016 | 0.012 |
| Inventive Example 4 | Inventive Steel 2 | 880 | 640 | 75 | 760 | 70 | 0.62 | 0.011 | 0.024 |
| Inventive Example 5 | Inventive Steel 2 | 880 | 640 | 80 | 830 | 35 | 0.62 | 0.025 | 0.020 |
| Inventive Example 6 | Inventive Steel 3 | 890 | 620 | 72 | 800 | 90 | 0.55 | 0.018 | 0.026 |
| Inventive Example 7 | Inventive Steel 4 | 890 | 620 | 78 | 820 | 60 | 0.55 | 0.019 | 0.030 |
| Inventive Example 8 | Inventive Steel 5 | 890 | 680 | 74 | 780 | 150 | 0.60 | 0.008 | 0.042 |
| Inventive Example 9 | Inventive Steel 5 | 890 | 680 | 74 | 820 | 60 | 0.60 | 0.014 | 0.036 |
| Comparative Example 1 | Inventive Steel 1 | 700 | 680 | 84 | 580 | 90 | 0.21 | 0.003 | 0.028 |
| Comparative Example 2 | Inventive Steel 2 | 880 | 640 | 50 | 830 | 15 | 0.62 | 0.004 | 0.043 |
| Comparative Example 3 | Inventive Steel 3 | 890 | 520 | 93 | 800 | 50 | 0.79 | 0.003 | 0.009 |
| Comparative Example 4 | Inventive Steel 4 | 890 | 760 | 78 | 880 | 240 | 0.55 | 0.048 | 0.014 |
| Comparative Example 5 | Comparative Steel 1 | 920 | 680 | 78 | 820 | 90 | 0.21 | 0.001 | 0.002 |
| Comparative Example 6 | Comparative Steel 2 | 890 | 640 | 75 | 800 | 90 | 0.52 | 0.003 | 0.027 |
| Comparative Example 7 | Comparative Steel 3 | 890 | 640 | 75 | 800 | 60 | 0.55 | 0.002 | 0.035 |
| Comparative Example 8 | Comparative Steel 4 | 890 | 640 | 75 | 800 | 60 | 0.55 | 0.001 | 0.058 |
| Comparative Example 9 | Comparative Steel 5 | 890 | 640 | 75 | 800 | 60 | 0.55 | 0.003 | 0.052 |

TABLE 3

| Classification | Pass-through ability | $C_v$ value (%) | $MV_v$ value (%) | Bubble defect presence or absence of occurrence | Fishscale presence or absence of occurrence | Enamel adhesion (%) | Hydrogen permeation ratio (sec/mm$^2$) |
|---|---|---|---|---|---|---|---|
| Inventive Example 1 | O | 1.53 | 0.087 | O | O | 99.4 | 710 |
| Inventive Example 2 | O | 1.49 | 0.101 | O | O | 99.8 | 745 |
| Inventive Example 3 | O | 1.51 | 0.099 | O | O | 99.3 | 811 |
| Inventive Example 4 | O | 0.91 | 0.093 | O | O | 100 | 824 |
| Inventive Example 5 | O | 1.02 | 0.115 | O | O | 100 | 895 |
| Inventive Example 6 | O | 1.68 | 0.114 | O | O | 100 | 945 |
| Inventive Example 7 | O | 2.29 | 0.127 | O | O | 99.1 | 1003 |
| Inventive Example 8 | O | 2.28 | 0.134 | O | O | 98.5 | 982 |
| Inventive Example 9 | O | 2.14 | 0.109 | O | O | 100 | 1054 |
| Comparative Example 1 | X | 0.45 | 0.046 | X | X | 85.4 | 511 |
| Comparative Example 2 | X | 0.59 | 0.058 | X | X | 89.6 | 549 |
| Comparative Example 3 | X | 2.59 | 0.179 | Δ | X | 90.2 | 527 |
| Comparative Example 4 | X | 2.74 | 0.038 | X | X | 83.7 | 553 |
| Comparative Example 5 | X | 0.01 | 0.002 | O | X | 80.3 | 298 |
| Comparative Example 6 | X | 0.32 | 0.054 | X | X | 85.1 | 357 |
| Comparative Example 7 | O | 0.59 | 0.042 | X | X | 83.3 | 342 |
| Comparative Example 8 | X | 3.69 | 0.061 | X | X | 71.2 | 529 |
| Comparative Example 9 | X | 0.32 | 0.043 | X | X | 74.6 | 482 |

As can be seen in Tables 1 to 3, Inventive Examples 1 to 9, which satisfy all of the component compositions, manufacturing conditions, and oxide layer thickness of the present invention, not only had good pass-through ability, but also satisfied the limited ranges of the present invention in terms of carbide and micropore fractions and related indices, did not have enamel defects such as fishscale and bubble defects even under harsh treatment conditions, and satisfied the enamel adhesion of 95% or greater, and the hydrogen permeability ratio of 600 sec/mm$^2$ or greater, thereby securing the properties targeted by the present invention.

On the other hand, Comparative Examples 1 to 4, which satisfied the alloy composition presented in the present invention but did not satisfy the oxidation capacity and time range during the final annealing, did not properly form an oxide layer, so it can be seen that the targeted properties could not be secured. As shown in Table 3, it can be seen that, as the distribution of micropores deviates from the management standards, the hydrogen permeation ratio is lower than the target (Comparative Examples 1 to 4), the enamel adhesion is less than 95% (Comparative Examples 1 to 4), or the enamel defects such as the bubble defect or the fishscale occur after the enamel treatment, so it was not possible to secure the targeted properties as a whole.

Comparative Examples 5 to 9 are cases where the manufacturing conditions presented in the present invention were partially satisfied but the alloy composition was not satisfied. Comparative Examples 5 to 9 not only did not satisfy the management standards of cementite and micropore area fractions, surface oxide layer thickness, adhesion index, hydrogen permeability ratio, enamel adhesion, and the like of the present invention for each thickness direction, but also caused fishscale or bubble defects even when observed with the naked eye after enamel treatment, and thus, had a problem in applicability.

Figure 2:
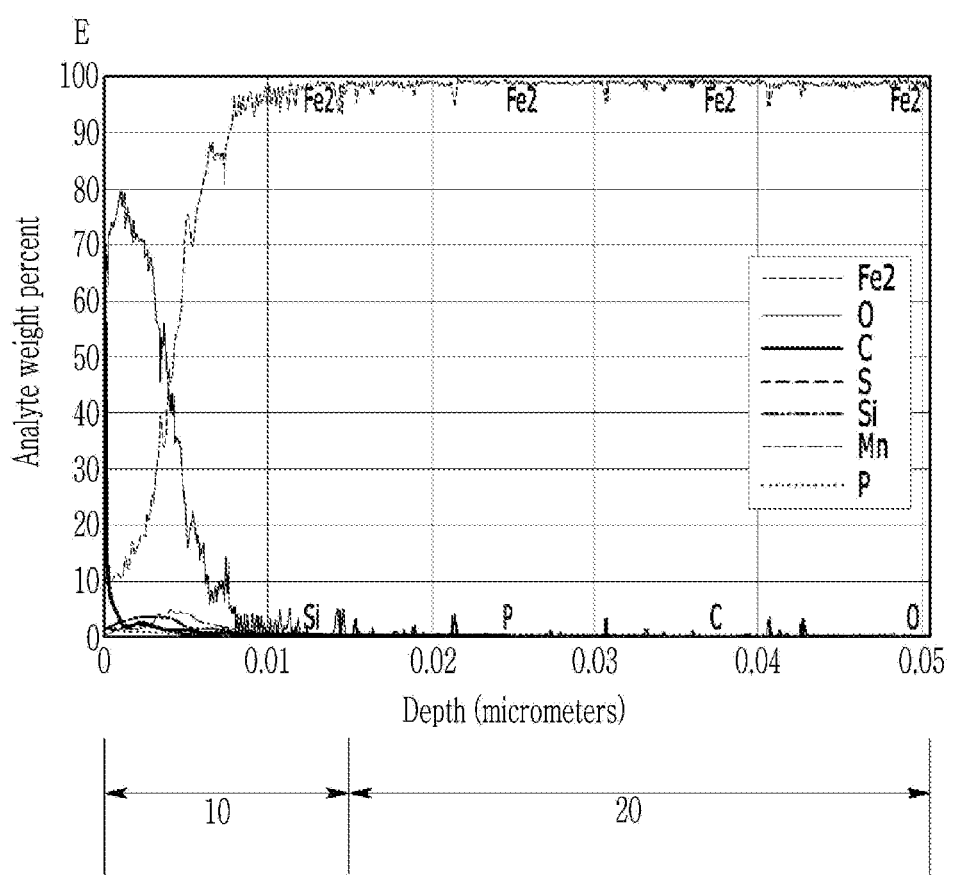
FIG. 2 is a glow discharge spectroscopy (GDS) analysis result for each depth of an enamel steel sheet according to Inventive Example 3.

FIG. 2 shows a glow discharge spectroscopy (GDS) analysis result for each thickness of an enamel steel sheet according to Inventive Example 3. It can be seen that the innermost point where the oxygen content is 5 wt % is 0.016 μm, and the oxide layer 20 having a thickness of 0.016 μm is present on the surface.

It will be understood by one skilled in the art to which the present invention belongs that the present invention is not limited to the above exemplary embodiments, but can be manufactured in a variety of different forms, and can be implemented in other specific forms without changing the technical spirit or essential features of the present invention. Therefore, the exemplary embodiments described above should be understood as illustrative in all respects and not for purposes of limitation.

| [REFERENCE SIGNS LIST] | |
|---|---|
| 100: Enamel steel sheet, | 10: Steel sheet substrate, |
| 20: Oxide layer | |

The invention claimed is:

1. An enamel steel sheet comprising: by wt %, 0.01 to 0.05% of C, 0.05 to of Mn, 0.001 to 0.03% of Si, 0.03 to 0.12% of Al, 0.001 to 0.02% of P, 0.001 to 0.02% of S, 0.004% or less (excluding 0%) of N, 0.001 to 0.003% of B, or less (excluding 0%) of O, and the balance of Fe and inevitable impurities, and
an oxide layer in an inside direction from a surface, the oxide layer having a thickness of 0.006 to 0.030 μm.

2. The enamel steel sheet of claim 1, wherein the enamel steel sheet satisfies Equation 1 below, $$0.002 \leq (1.4 \times [B] \times [Al])/[N] \leq 0.0095 \qquad \text{[Equation 1]}$$

(In Equation 1, [B], [Al], and [N] represent the contents (atomic %) of B, Al and N, respectively).

3. The enamel steel sheet of claim 1, wherein: the oxide layer includes 90 wt % or more of Fe oxide.

4. The enamel steel sheet of claim 1, wherein: a cementite fraction difference (Cv) calculated by Equation 2 below is to 2.5%, $$CV = C_{1/2t} - C_{1/8t} \qquad \text{[Equation 2]}$$

(In Equation 2, $C_{1/2t}$ and $C_{1/8t}$ represent the cementite fraction in a center and a 1/8 site in a thickness direction of the steel sheet, respectively).

5. The enamel steel sheet of claim 1, wherein: a micropore area ratio difference (MVv) for each site calculated by Equation 3 below is 0.075 to 0.155%, $$MVv = MV_{1/8t} - MV_{Av} \qquad \text{[Equation 3]}$$

(In Equation 3, $MV_{1/8t}$ and $MV_{Av}$ represent a ⅛ site and an average micropore fraction in a thickness direction, respectively).

6. The enamel steel sheet of claim 1, further comprising at least one of:
wt % or less of Cu, and 0.005 wt % or less of Ti.

7. The enamel steel sheet of claim 1, wherein:
enamel adhesion is 95% or greater.

8. The enamel steel sheet of claim 1, wherein:
a hydrogen permeation ratio is 600 sec/mm² or greater.

9. A method of manufacturing an enamel steel sheet, the method comprising:
manufacturing a hot-rolled steel sheet by hot-rolling a slab comprising, by wt %, 0.02 to 0.08% of C, 0.05 to 0.8% of Mn, 0.001 to 0.03% of Si, 0.03 to of Al, 0.001 to 0.02% of P, 0.001 to 0.02% of S, 0.004% or less (excluding 0%) of N, 0.001 to 0.003% of B, 0.003% or less (excluding 0%) of O, and the balance of Fe and inevitable impurities;
manufacturing a cold-rolled steel sheet by cold-rolling the hot-rolled steel sheet; and
annealing the cold-rolled steel sheet,
wherein, in the annealing, heat treatment is performed for 20 seconds to 180 seconds in a wet atmosphere having an oxidation capacity index ($PH_2O/PH_2$) of 0.51 to 0.65.

10. The method of claim 9, wherein:
the slab satisfies Equation 1 below, $$0.002 \leq (1.4 \times [B] \times [Al])/[N] \leq 0.0095 \qquad \text{[Equation 1]}$$

(In Equation 1, [B], [Al], and [N] represent the contents (atomic %) of B, Al and N, respectively).

11. The method of claim 9, wherein:
the slab is hot-rolled at a finishing rolling temperature of 850° C. to 910° C.

12. The method of claim 9, wherein:
in the manufacturing of the hot-rolled steel sheet, the hot-rolled steel sheet is wound at 580° C. to 720° C.

13. The method of claim 9, wherein:
in the manufacturing of the cold-rolled steel sheet, the cold rolling is performed at a reduction ratio of 60 to 90%.

14. The method of claim 9, wherein:
in the annealing of the cold-rolled steel sheet, the annealing is performed at 720° C. to 850° C.

15. The method of claim 9,
further comprising temper rolling at a reduction ratio of 3% or less after the annealing of the cold-rolled steel sheet.

\* \* \* \* \*